United States Patent [19]
Fujita et al.

[11] 3,934,269
[45] Jan. 20, 1976

[54] APPARATUS FOR CONTROLLING THE ROTATION OF A ROTATING BODY IN A RECORDING AND/OR REPRODUCING APPARATUS

[75] Inventors: Mitsuo Fujita, Tokyo; Naoaki Sakaki, Murayama, both of Japan

[73] Assignee: Victor Company of Japan, Limited, Yokohama, Japan

[22] Filed: Aug. 1, 1973

[21] Appl. No.: 384,681

[30] Foreign Application Priority Data

| Aug. 3, 1972 | Japan | 47-77814 |
| Oct. 11, 1972 | Japan | 47-101145 |
| Jan. 26, 1973 | Japan | 48-10887 |
| Jan. 27, 1973 | Japan | 48-10692 |

[52] U.S. Cl. ............... 360/70; 360/75; 318/314; 318/327
[51] Int. Cl.² ............ G11B 21/04; G11B 21/02
[58] Field of Search ........ 360/70, 75; 318/326, 328, 318/327, 318, 314; 328/133, 134; 307/233

[56] References Cited
UNITED STATES PATENTS

| 3,086,157 | 4/1963 | Branco | 318/328 |
| 3,152,226 | 10/1964 | Stratton | 360/75 |
| 3,355,649 | 11/1967 | Boylan | 318/314 |
| 3,356,921 | 12/1967 | Bradford | 318/314 |
| 3,542,949 | 11/1970 | Tanaka | 360/70 |
| 3,577,056 | 5/1971 | Tsujikawa | 318/318 |
| 3,651,276 | 3/1972 | Clark | 360/70 |
| 3,663,764 | 5/1972 | Trost | 360/70 |
| 3,663,884 | 5/1972 | Pattantyus | 328/134 |
| 3,686,432 | 8/1972 | Deguchi | 360/70 |

*Primary Examiner*—Bernard Konick
*Assistant Examiner*—Alan Faber

[57] ABSTRACT

The invention provides an apparatus for controlling the rotation of a rotating body in a recording and/or reproducing apparatus. First, the apparatus detects the rotational speed of the rotating body, as it is driven by a DC motor. Detection is in terms of a frequency which is $n$ times the speed, in which $n \gg 1$. Second, there is a detection of the rotational phase of the rotating body. The DC motor is driven to rotate in accordance with a controlling signal obtained by using first and second output error signals responsive to the first and second detections. The DC motor is driven by means for superimposing an AC signal generated with a constant period and the first and second output error signals. The superimposed signals are sliced at a predetermined level to perform "ON" – "OFF" operations and a smooth output to control the driving rotation of the DC motor.

11 Claims, 15 Drawing Figures

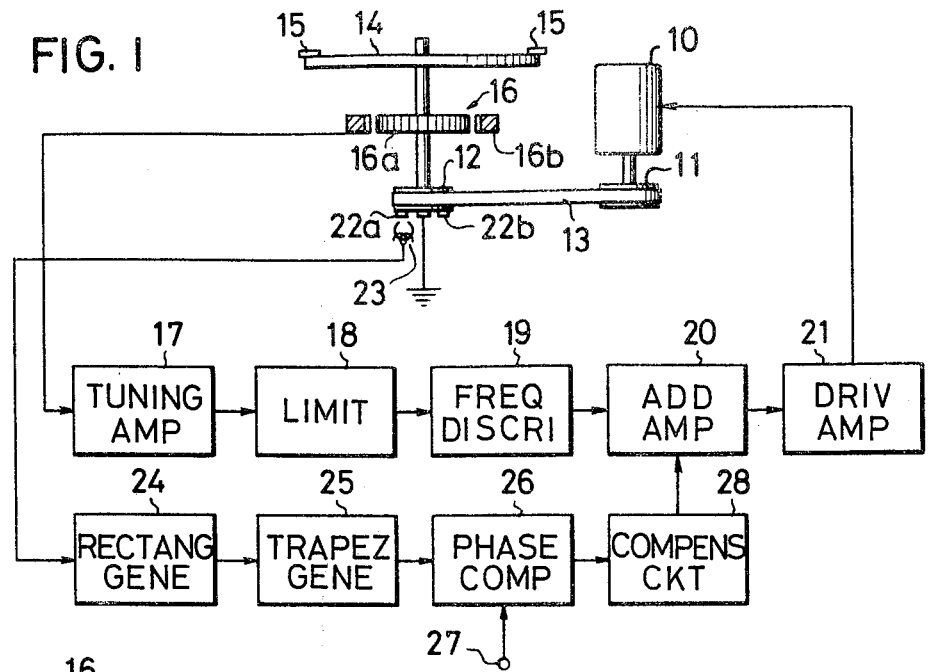
FIG. I
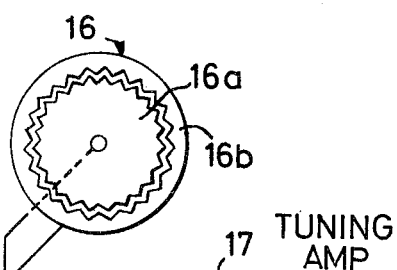
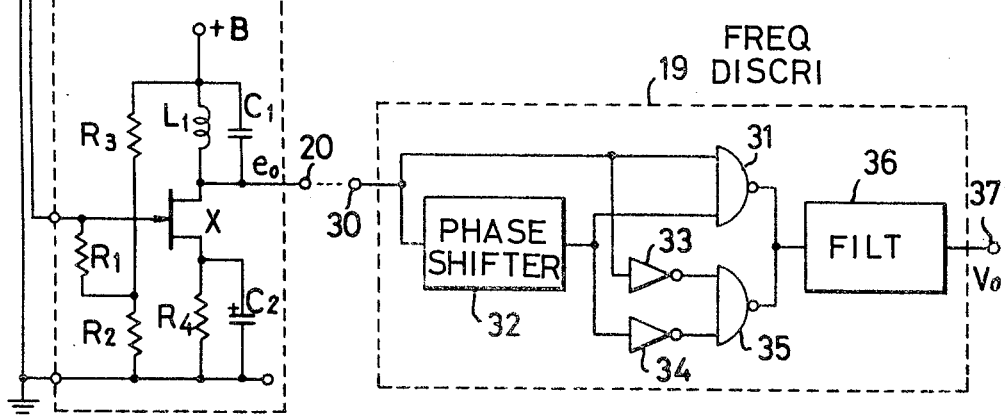
FIG. 2

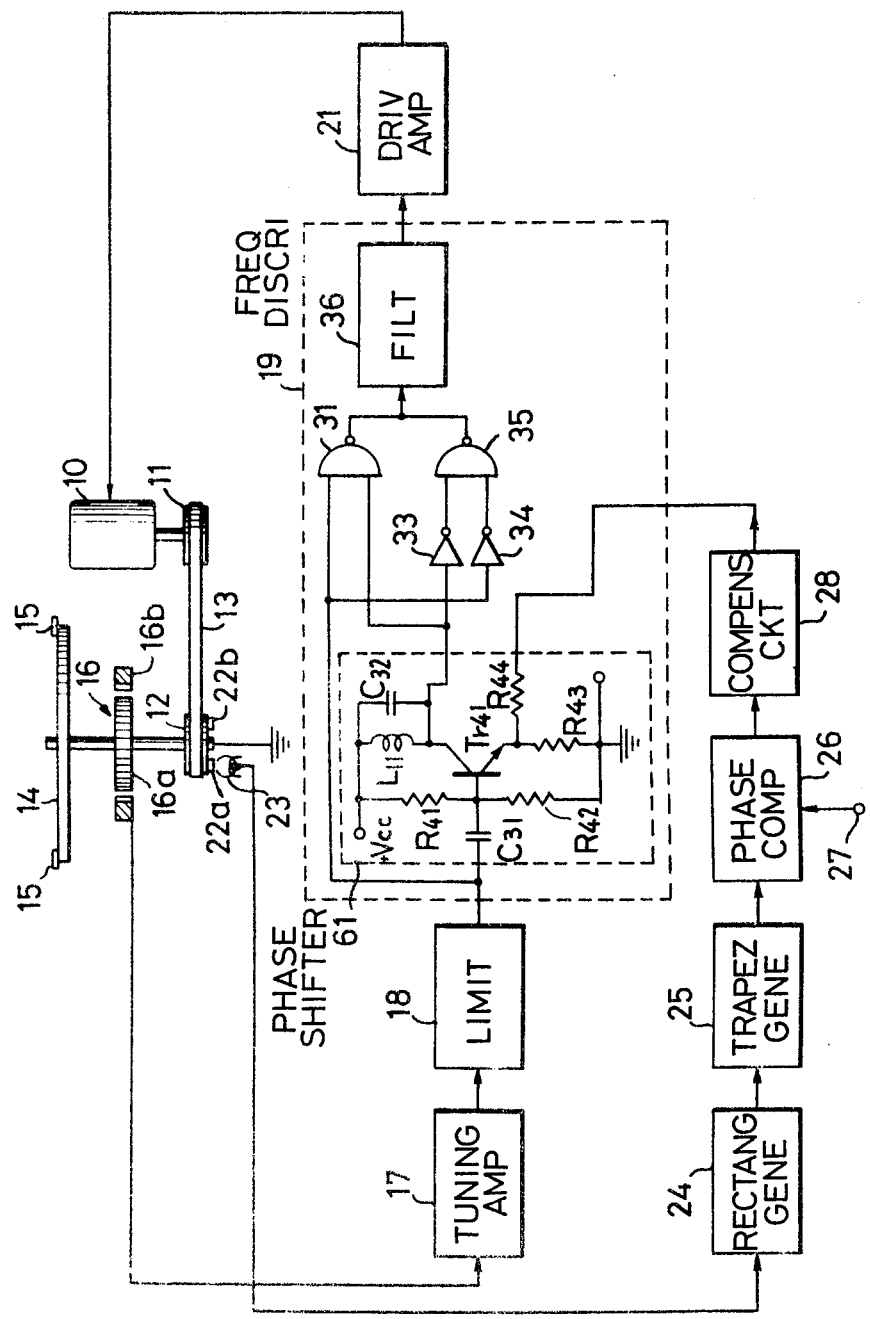
FIG. II

APPARATUS FOR CONTROLLING THE ROTATION OF A ROTATING BODY IN A RECORDING AND/OR REPRODUCING APPARATUS

BACKGROUND OF THE INVENTION

This invention relates to an apparatus for controlling the rotation of a rotating body in a recording and/or reproducing apparatus, and more particularly to an apparatus for controlling the rotation of a direct current motor used to drive rotating heads or a capstan in the recording/reproducing apparatus. The motor is so controlled that the rotational speed and the rotational phase of the rotating heads or a capstan become and remain constant.

The present invention is one relating to and improving the invention described in a copending U.S. Pat. application Ser. No. 379,855, "APPARATUS FOR CONTROLLING ROTATION OF ROTATING BODIES AT CONSTANT SPEED" filed on July 16, 1973, now abandoned.

Various proposals have heretofore been made for a so-called head servo system. These systems control the rotation of rotating heads for recording/reproducing video signals on/from a magnetic tape. Or, a so-called capstan servo system controls the rotation of a capstan for driving a magnetic tape and causing it to travel in a recording/reproducing apparatus. In all apparatus based on these previously proposed systems, however, the control circuits tend to become complex and large, and large amounts of electric power are consumed. It has been difficult to realize in practice a device which has a miniature and simple circuit organization and, moreover, is capable of controlling rotation with a high degree of accuracy.

On one hand, there has recently been a great effort to miniaturize apparatus for magnetic recording and/or reproducing of video signals. The recent trend has been toward a wide use of a apparatus of portable and very small type in which a magnetic tape is accommodated within a cartridge. The power source is self contained within the apparatus.

Accordingly, there is great demand for the practical realization of a rotation control system and apparatus suitable for video-signal recording and/or reproducing apparatus, particularly of the above mentioned portable type.

SUMMARY OF THE INVENTION

Accordingly, it is a general object of the present invention to provide a novel and useful apparatus for controlling the rotation of rotating heads or a capstan, in which the above described requirements are fulfilled.

More specifically, an object of the invention is to provide an apparatus for controlling the rotation of a DC motor, to in turn control the rotational speed and the rotational phase of rotating heads or a capstan in a recording/reproducing apparatus. The apparatus has such a simple circuit construction that driving transistors of the driving amplifier of the motor carry out a switching operation therefore, the heat loss of the transistors is very small. The apparatus of the present invention is especially suitable for miniature magnetic recording/reproducing apparatus of types such as the portable types.

Another object of the present invention is to provide an apparatus for controlling the rotation of a DC motor here, the apparatus comprises a constant-speed rotation control system having rotation frequency detecting means capable of detecting the rotational speed of a rotating body with a high frequency which is $n$ times (where $n \gg 1$) and a constant-phase rotation control system having rotational phase detecting means.

A further object of the invention is to provide a rotation control apparatus of a simple construction which does not require an amplifier for adding the rotation frequency error output and the rotation phase error output.

Other objects and further features of the present invention will be apparent from the following detailed description with respect to preferred embodiments of the invention when read in conjunction with the accompanying drawings.

BRIEF DESCRIPTION OF THE DRAWINGS

In the drawings:

FIG. 1 is a schematic diagram of a head servo system as one embodiment of the apparatus for controlling the rotation of a rotating body according to the invention;

FIG. 2 is a schematic circuit diagram indicating the details of the portions of a rotation detecting device, a tuning type amplifier, and a frequency discriminator;

FIG. 11 is a schematic diagram of a head servo mechanism as a third embodiment of the rotation controlling apparatus according to the invention;

DETAILED DESCRIPTION

Figure 3:
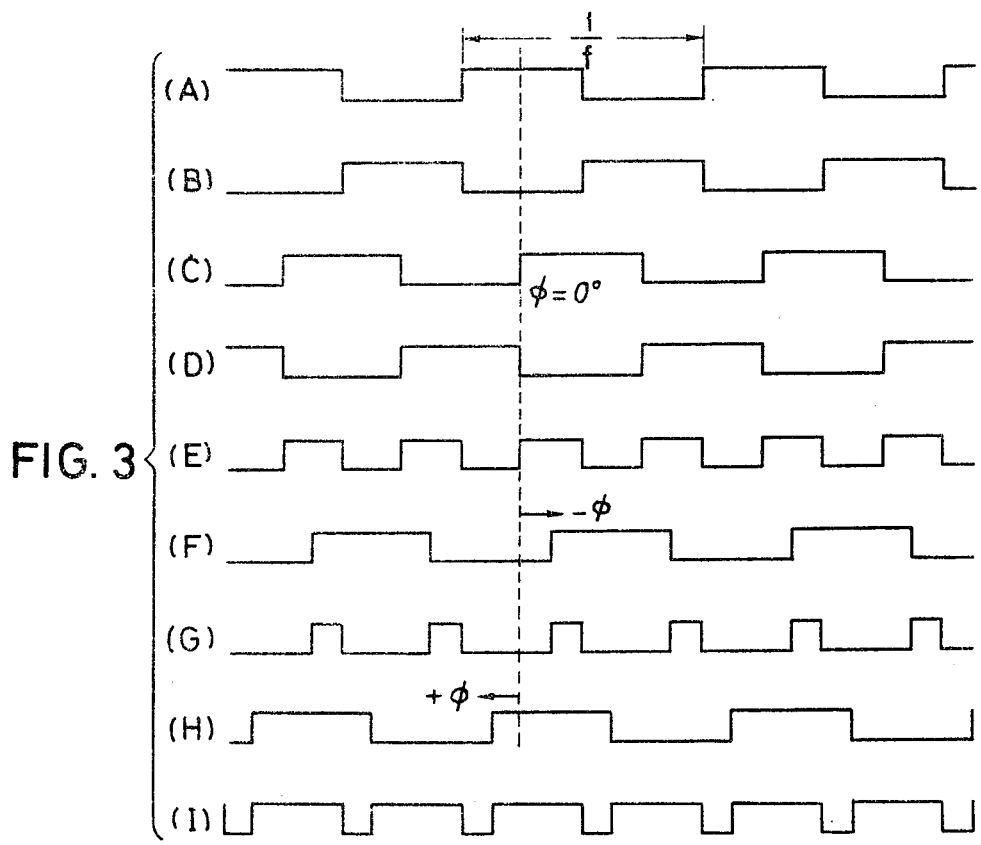
FIGS. 3 (A) through 3 (I) are respectively schematic diagrams of signal waveforms for illustrating the operation of a frequency discriminator.

Referring first to FIG. 1, a direct-current (DC) motor 10 is to be controlled by the apparatus of the present invention. Motor 10 has a rotor shaft supporting fixedly a pulley 11, which is coupled to another pulley 12 by an endless belt 13 stretched therearound. The pulley 12 is adapted to rotate unitarily and coaxially with a head plate 14 carrying rotating magnetic heads 15, for recording/reproducing video signals on/from magnetic tape (not shown), and also to rotate with an inner gear 16a of a rotation detecting device 16.

The rotation detecting device 16, as indicated in FIG. 2, comprises the pulley 12, the inner gear 16a unitarily rotatably with the head plate 14, and stationary outer gear 16b encompassing the inner gear 16a. Gears 16a and 16b are spaced apart by a small gap which does not cause obstruction of the rotation of the inner gear 16a. The outer periphery of the inner gear 16a, which is an external gear, and the inner periphery of the outer gear 16b, which is an internal gear, are respectively provided with $n_1$ teeth and have therebetween an electrostatic capacitance $C_o$.

When the inner gear 16a and the head plate 14 rotate together through one revolution, the electrostatic capacitance $C_o$ varies sinusoidally $n_1$ times. Therefore, when the head plate 14 and the inner gear 16a rotate with a frequency $n_2$, the electrostatic capacitance $C_o$ varies with a frequency $$f_o = n_1 \times n_2, \text{ (Hz)}$$

The capacitance is represented as follows;

$$C_o = C + \Delta C \sin 2\pi f_o t.$$

The rotating inner gear 16a is grounded (connected to earth), while the stationary outer gear 16b is connected to a tuning type amplifier 17. Variations in the frequency $f_o$ of the electrostatic capacitance are detected by the tuning type amplifier 17. As a resultant effect, the rotational speed of the head plate 14 (i.e., that of the rotating heads) is detected. The output of the amplifier 17 is supplied through a limitter 18 to a frequency discriminator 19. Discriminator 19 thereupon produces an error voltage signal corresponding to the variations in the rotational speed of the head plate 14. The output of the frequency discriminator 19 is supplied to one of input terminals of the adding amplifier 20.

On the other hand, the above described pulley 12, has permanent magnets 22a and 22b diametrically affixed thereto at an angle of 180°. A detecting head 23 is located in a position opposite to the magnets 22a and 22b. Accordingly, pulses are produced by the detecting head 23 in the ratio of two pulses for one rotation of the head plate 14. The detected pulses produced by the detecting head 23 are applied to a rectangular wave generator 24 for generating a rectangular wave. The rectangular wave output is supplied to a trapezoidal wave generator 25, and converts it into a trapezoidal wave that it thereafter supplied to a phase comparator 26.

The phase comparator 26 is supplied with a reference signal from a terminal 27 to sample the above-mentioned trapezoidal. For the reference signal, a signal of 30 Hz is obtained by dividing in half the frequency of the vertical synchronizing signal of the recording video signal, which is used during the recording time. During the reproducing, a control signal is reproduced from a tape. The output error signal of the phase comparator 26 is applied to the other input terminal of the above-mentioned adding amplifier 20 through a compensating circuit 28.

In the adding amplifier 20, a signal from the frequency discriminator 19 and a signal from the compensating circuit 28 are added and combined. The resultant output signal is amplified through a driving amplifier 21 and to the DC motor 10, to drive and control the rotation thereof.

In the above-mentioned block diagram, a loop is formed through the rotation detecting device 16, the tuning type amplifier 17, the limiter 18, the frequency discriminator 19, and the adding amplifier 20. This loop constitutes a constant rotation speed control system to maintain the rotation of the rotary head 15 at constant speed. On the other hand, a loop formed through the detecting head 23, the rectangular wave generator 24, the trapezoidal wave generator 25, the phase comparator 26, the compensating circuit 28, and the adding amplifier 20 constitutes a constant phase control system, to maintain constant the rotational phase of the rotary head 15.

Next, the circuit construction and its operation, incorporating the portions of the above-mentioned controlling systems, are described.

FIG. 2 shows one embodiment of a practical construction of the above-mentioned rotation detecting device 16, the tuning type amplifier 17, and the frequency discriminator 19. The gate of a field-effect transistor (FET) X is connected to the aforementioned outer gear 16b. The source thereof is grounded by way of a resistor R4 and a by-pass capacitor C2. Accordingly, a variation in the above mentioned capacitance $C_o$ is applied across the gate and source of the transistor X. The voltage of a power supply +B is divided by resistors R2 and R3 and applied to the gate of the transistor X via a resistor R1 having a sufficiently high resistance value (more than 1MΩ). A tank circuit comprising a coil L1 and a capacitor C1 is connected to the drain of the transistor X. The constants of the elements of this tank circuit are selected to provide a resonance frequency equal to the aforementioned frequency $f_o$.

For the sake of convenience and clarity in description, it will be assumed that a variable capacitance element of an electrostatic capacitance $C_o$ exists, and that a constant DC voltage $e_o$ is being applied to a series circuit comprising the variable capacitance $C_o$ and the resistor R1. If the capacitance $C_o$ is constant, the capacitance element will be charged to the capacitance $C_o$. The terminal voltage rises to $e_o$, and a charge Q is accumulated in the capacitance element $C_o$. However, even if the capacitance value of the variable capacitance $C_o$ varies, the charge Q accumulated in this element cannot suddenly change. Since the relationship $V = Q/C_o$ is valid, in general, the voltage V varies with a change in the capacitance $C_o$.

This voltage V is applied on the gate of the FET transistor X. Since a resonance circuit is connected to the drain side of the transistor X, the voltage V is amplified when its change frequency is close to the resonance frequency of the resonance circuit. The variation frequency of the capacitance $C_o$ appears as a voltage between the drain of the transistor X and ground.

In the circuit of the above described organization, the electrostatic capacitance $C_o$ varies at a certain frequency in response to a rotation of the head plate 14. An output signal $e_o$ is obtained from the terminal 20 of the drain of the transistor X, only when the rotational frequency coincides with a specific frequency band having, as its central value, the resonance frequency $f_o$ of the above mentioned tank circuit. Accordingly, this means that the tuning type amplifier 17 has a detection characteristic which is determined by the resonance characteristic of the mechanical system and by the resonance characteristic of the tank circuit. For this reason, if there is a mixture of external disturbance (such as noise or hum) in the input, the output signal will not be impaired thereby. Thus, the tuning type amplifier 17 is capable of detecting the rotational speed $n_2$ (Hz) of the head plate 14, as an electrical signal which is $n_1$ times higher than a frequency $f_o$, this number $n_1$ being determined by the number of teeth of the gears 16a and 16b.

The output signal $e_o$ from the output terminal 20 of the above described tuning type amplifier 17 is applied to an input terminal 30 of the frequency discriminator 19. The signal is also applied directly to one input terminal of a NAND circuit 31 and, at the same time, is applied by way of a phase shifter 32 to the other input terminal of the NAND circuit 31. Simultaneously, the signal introduced through the input terminal 30 is applied by way of a phase inverting circuit 33 on one input terminal of a NAND circuit 35. At the same time, the signal is applied through a phase shifter 32 and a phase inverting circuit 34 on the other input terminal of the NAND circuit 35. The outputs of these NAND circuits 31 and 35 pass through a filter 36 and an output terminal 37, as an output signal voltage Vo.

Phase shifter 32 operates, with the frequency $f_o$ as a reference, to produce a lag in phase with respect to an input signal of a frequency higher than $f_o$ and to produce an advance in phase with respect to an input signal of a frequency lower than frequency $f_o$.

Here, for convenience in description, it will be assumed that the input signal $e_o$ has a rectangular waveform of a frequency $f_o$, as indicated in FIG. 3 (A). Signal $e_o$ is phase shifted, as indicated in FIG. 3 (C), by the phase shifter 32. At this time, the signals indicated in FIGS. 3 (A) and 3 (C) are applied on the NAND circuit 31. Signals of rectangular waveform as indicated in FIGS. 3 (B) and 3 (D), resulting from an inversion of the signals shown in FIGS. 3 (A) and 3 (C), are applied on the NAND circuit 35. Therefore, a signal resulting from the combination of the outputs of these two NAND circuits has a rectangular waveform as indicated in FIG. 3 (E). This signal is smoothed by the filter 36 and is led out through the output terminal 37, as an output error signal Vo.

If the rotational speed of the heads 15 should rise above the normal speed, the frequency of the input signal $e_o$ of the frequency discriminator 19 becomes higher than the central reference frequency $f_o$. The output of the phase shifting circuit 32 lags in phase by $\phi$ in accordance with the circuit 32 characteristic and becomes a signal as indicated in FIG. 3 (F). Consequently, the combined output of the NAND circuits 31 and 35 have a waveform as indicated in FIG. 3 (G) with a pulse width which is narrower than the width shown in FIG. 3 (E). For this reason, the direct-current error signal obtained by smoothing the signal indicated in FIG. 3 (G) will be smaller than that in the normal state. On the other hand, if the rotational speed of the heads 15 should become slower than the normal speed, the input signal $e_o$ will be advanced in phase by $\phi$ as indicated in FIG. 3 (H). The combined output of the NAND circuits 31 and 35 will assume a waveform of broad pulse width as indicated in FIG. 3 (I). For this reason, the direct-current error signal produced by smoothing this signal shown in FIG. 3 (I) will become large.

Therefore, output error signal Vo has a magnitude inversely proportional to the frequency of the input signal $e_o$ owing to the above described frequency discriminator 19.

Figure 4:
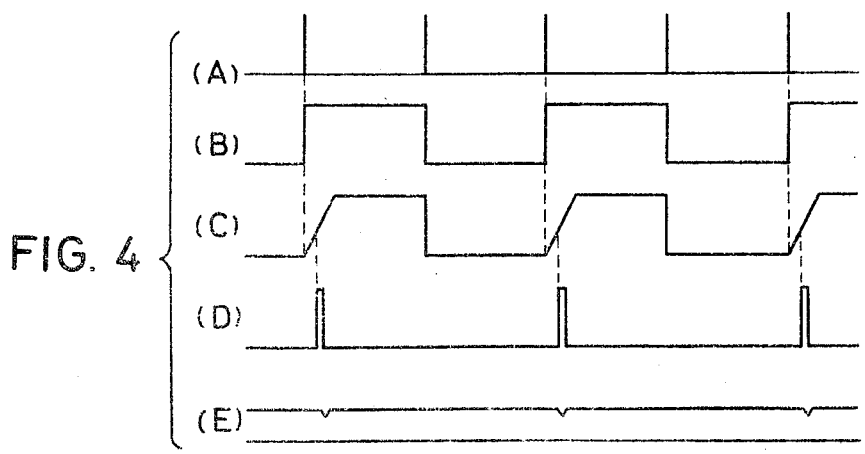
FIGS. 4 (A) through 4 (E) are respectively diagrams of signal waveforms for illustrating the operation of a constant phase controlling system.

With respect to the constant phase controlling system, a description is made with reference to FIGS. 4 (A) through 4 (E).

FIG. 4 (A) shows a pulse picked up by the detecting head 23. The rectangular wave generator 24 converts this pulse into a rectangular wave, shown in FIG. 4 (B) by a regular bistable multi-vibrator which may be employed for this rectangular wave generator 24. The above-mentioned rectangular wave is applied to the trapezoidal wave generator 25 and thereby converted into the trapezoidal wave shown in FIG. 4 (C).

This trapezoidal wave is supplied to the phase comparator 26 and then sampled responsive to the reference pulse, FIG. 4 (D), applied through the terminal 27. Here, with respect to the reference pulse, a vertical synchronizing signal derived from the recording video signal is used in the recording time. In the reproducing time, a control signal is reproduced from the magnetic tape. As a result, a pulse has a wave value proportional to the advance or lag of the reference pulse as compared to the phase of the pulse detected from the detecting head 23. This pulse may be withheld until a subsequent pulse may appear, whereby a phase comparator error output signal is obtained as shown in FIG. 4 (E). This phase comparator error output signal is a DC signal of a magnitude corresponding to the rotational phase of the rotary head 15.

The phase compared error output voltage shown in FIG. 4 (E) becomes higher when the phase of the rotary head 15 advances more than the phase of the reference pulse. Inversely, it becomes lower when it lags more than the phase of the reference pulse. This error output signal voltage corresponds to the rotational phase of the rotary head 15 and is supplied to the above-mentioned adding amplifier 26.

Figure 5:
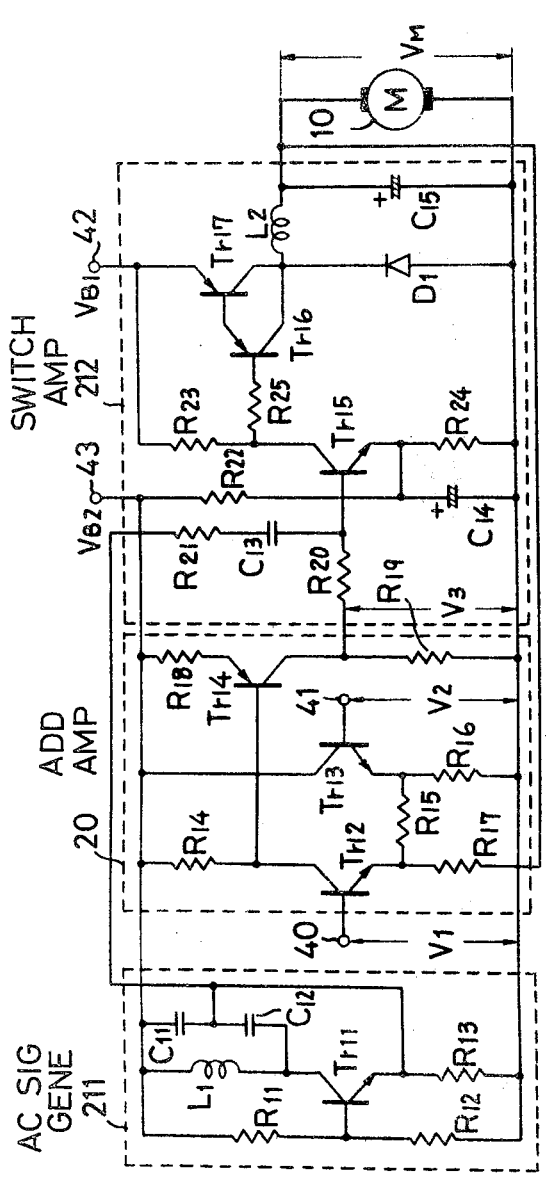
FIG. 5 is a circuit diagram showing one embodiment of a circuit incorporating the portions of an adding amplifier and a motor driving amplifier.

With reference to FIG. 5, a first embodiment of the circuit incorporating the above-mentioned adding amplifier 20 and the driving amplifier 21 will now be explained. This embodiment of the motor driving amplification circuit 21 comprises, essentially, an AC signal generating circuit 211 for generating an AC signal of constant period and constant amplitude. A switching amplification circuit 212 produces an output voltage, proportional to the DC input voltage as it causes the drive transistors Tr16 and Tr17 to perform a switching operation.

In the AC signal generating circuit 211, the base of a transistor Tr11 is biased by resistors R11 and R12. A resistor R13 is connected to the emitter of transistor Tr11. A parallel circuit of a coil L1 and a series of capacitors C11 and C12 are connected to the collector of this transistor. The junction point between the capacitors C11 and C12 is connected to the emitter of the transistor and to the base of a transistor Tr15, by way of a resistor R21 and a capacitor C13. Accordingly, a specific AC signal (a sinusoidal wave, as in the instant example, a sawtooth wave, a triangular wave, or the like) is generated in this AC signal generating circuit 211 and has a constant period, a constant amplitude, and a sloped part. This AC signal is applied to the base of the transistor Tr15.

On one hand, the input control signal V1, from the frequency discriminator 19, is applied through a terminal 40 to the base of a transistor Tr12 of the adding amplifier 20. The emitter of this transistor Tr12 is connected by way of a resistor R15 to the emitter of a transistor Tr13. The collector output of the transistor Tr12 is applied to the base of a transistor Tr14. The phase error signal V2 passed from the phase comparator 26 through the compensating circuit 28 is applied on the base of the transistor Tr13 through a terminal 41. A resistor R16 is connected to the emitter of the transistor Tr13. The emitter of the transistor 14 is connected by way of a resistor R18 to a terminal 43 of an operation power source $V_{B2}$. A resistor R19 is connected to the collector of the transistor Tr14. The control input signal is further amplified by this transistor Tr14 and applied through a resistor R20 to the base of transistor Tr15.

The terminal voltage of the DC motor 10 is applied, as a negative feedback, through resistor R17 to the emitter of the transistor Tr12 of the adding amplifier 20 and, further, by way of the resistor R15 to the emitter of the transistor Tr13.

The operations of the circuits of the above described organizations will now be described.

A slicing means acts upon the error signals respectively applied to the bases of the transistors Tr12 and Tr13. These signals are are added and amplified by the adding amplifier 20, whereby the output voltage V3 appears across the resistor R19. This output voltage V3 becomes high (or low) when the above-mentioned first error voltage V1 is high (or low). When the second error voltage V2 is high (or low), the voltage V3 becomes low (or high).

A combined signal is applied to the base of the transistor Tr15. This signal is a superimposition of a sinusoidal wave of a constant amplification Ao and a control input signal V3 amplified by the adding amplifier 20. The transistor Tr15 switches "ON" when this combined signal becomes greater than the slicing level Vs, as determined by the emitter potential of the transistor Tr6 fixed by resistors R22 and R24 and the capacitor C14. A current then flows through the transistor Tr15 becomes "ON", and a current flows through a terminal 42 of an operation power source $V_{B1}$, by way of a resistor R23, and through the transistor Tr15.

For this reason, the terminal voltage of the resistor R23 is applied to the transistor Tr16 and Tr17, connected in a Darlington connection. Both of these transistors switch "ON". A rectangular waveform voltage substantially equal to the voltage of the operation power source $V_{B1}$ appears at the collector of the transistor Tr17. This voltage is supplied to the DC motor 10, after being smoothed by a smoothing circuit comprising a coil L2 and a capacitor C15.

When the control voltage V3 becomes larger the interval during which the slicing level Vs is exceeded also becomes longer. The output voltage pulses of the transistors Tr16 and Tr17 also increase in width. Consequently, the DC output voltages obtained by smoothing these voltages also becomes higher than their normal values. On the other hand, when the control input signal becomes smaller, the period during which the slicing level Vs is exceeded becomes shorter. And the output voltage pulses of the transistors Tr16 and Tr17 also become smaller in width. Consequently, the DC output voltages obtained by smoothing these voltages also become lower than normal. Thus, a DC voltage, in proportion to the control voltage V3, is obtained as the output voltage of the switching amplification circuit 212, despite the switching of the driving transistors Tr16 and Tr17.

The entire circuit is arranged as a negative feedback amplifier, controlled by nagatively feeding back the output of the switching amplification circuit 212 to the adding amplifier 20. The amplification gain of the entire circuit is determined solely by the feedback ratio. The fluctuation of the power source voltage $V_{B1}$ has no effect. Furthermore, the gain adjustment is easy, since it is determined by selection of the values of the resistors R17 and R15.

When the rotational phase of the rotary head 15 is synchronized with the reference signal and the rotational phase of the rotary head 15 is slowed by disturbances such as, for example, variations of a load torque, the phase error output voltage V2 becomes lower and the output voltage V3 of the adding amplifier 20 becomes larger. Accordingly, at this time, the output of the driving amplifier 21 becomes larger to accelerate the DC motor 10 and rotation of the rotary head 15. Then, the constant speed controlling system damps the operation of the constant phase controlling system, which tends to accelerate the rotary head 15, and thereby, improve the damping characteristics of the constant phase controlling system.

Inversely to the above-mentioned case, if the phase of the rotary head 15 is advanced by disturbances, the phase control is carried out and the damping characteristics are improved. As the result, the present invention synchronizes the rotary phase of the rotary head 15 with respect to the reference signal.

Figure 6:
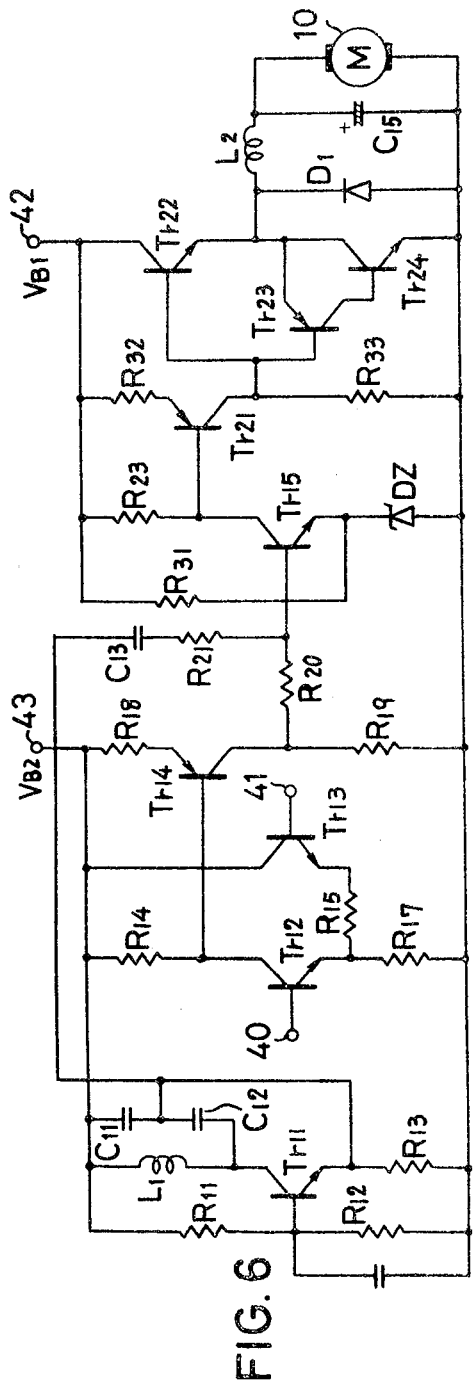
FIG. 6 is a circuit diagram of another embodiment of a circuit incorporating the portions of an adding amplifier and a motor driving amplifier.

Next to be described is a second embodiment of a circuit incorporating the adding amplifier 20 and the driving amplifier 21, as shown in FIG. 6. In the same figure, identical numerals indicate the identical parts, as in the circuit shown in FIG. 5, and the description thereof is omitted.

The collector output of the transistor Tr15 (in the rectangular wave approximate to the trapezoidal wave) is amplified by way of the transistor Tr21, and formed into a rectangular wave having a rising edge with a rise time which is less than 1 $\mu$sec. The output rectangular wave is applied to the bases of the transistors Tr22 and Tr23. When the collector output of the transistor Tr21 reaches a high level, the transistor Tr22 switches "ON" and the transistor Tr21 switches "OFF". On the other hand, when the collector output of the transistor Tr21 reaches at low level, the transistor Tr22 switches "OFF" and the transistors Tr23 and Tr24 switch "ON". The above-mentioned inverse operation is carried out for every one cycle of the described output rectangular wave.

By the "ON" or "OFF" operation of the transistor Tr22, power source voltage is passed in the rectangular waveform. This voltage is rectified and smoothed by way of the rectifying and smoothing circuit consisting of the coil L2 and the capacitor 15. Then, the smoothed voltage is applied to the DC motor 10. The transistors Tr23 and Tr24 are connected so that the speed reducing characteristics may be improved by way of shortcircuiting (through the coil L2) the two terminals of the motor 10 at the time of reducing the speed of the motor 10.

A second embodiment of the apparatus according to the invention will be described with reference to FIGS. 7 through 10.

Figure 7:
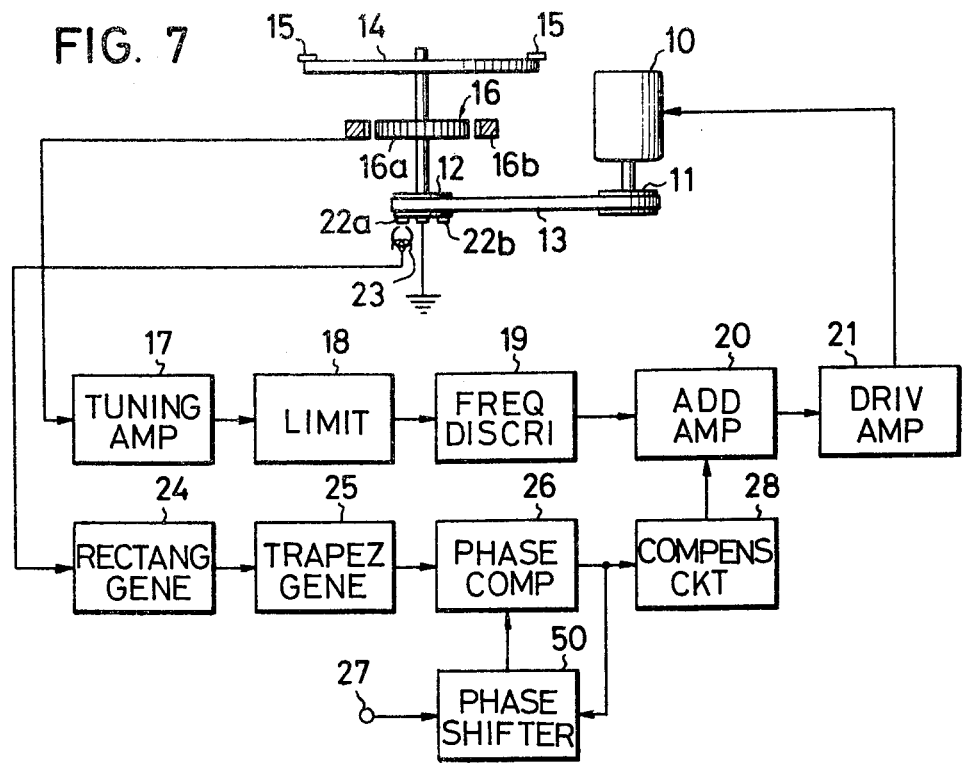
FIG. 7 is a schematic diagram of a head servo system, as a second embodiment of the rotation controlling apparatus according to the invention.
Figure 8:
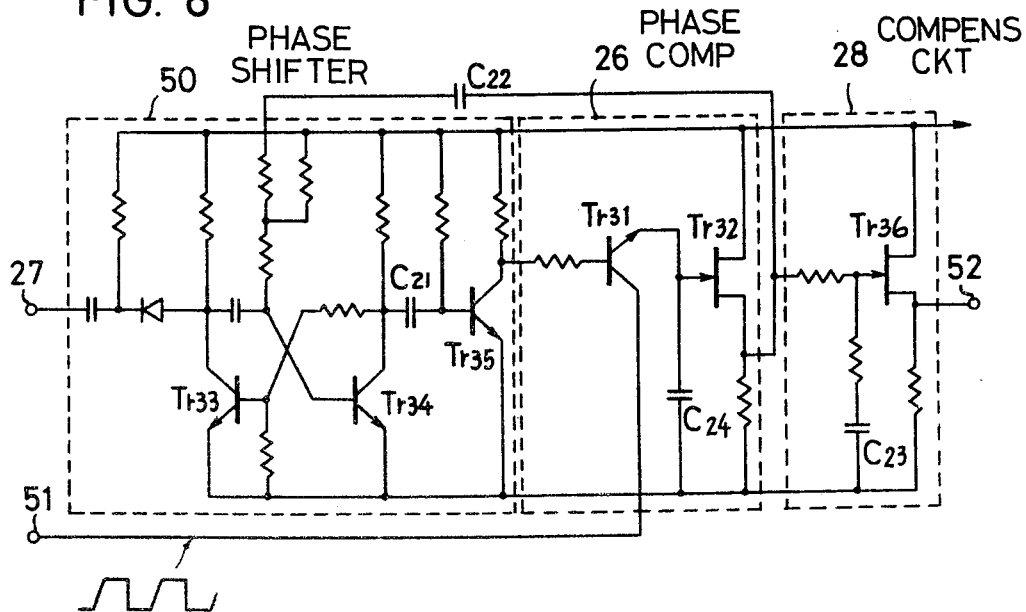
FIG. 8 is a circuit diagram of one embodiment of a circuit incorporating the portions of a phase comparator, a phase shifter, and a phase compensator shown in FIG. 7.

In FIG. 7, identical numerals are used to identify the identical parts in the block diagram of FIG. 1, and therefore the detailed description thereof is omitted. One embodiment of the circuit incorporating the portions of the phase shifter 50, the phase comparator 26, and the phase compensating circuit 28 of FIG. 7 is shown in FIG. 8.

The trapezoidal wave has an inclination in the rising portion. This wave is generated by the trapezoidal wave generator 25 and is applied through a terminal 51 onto the collector of a transistor Tr31 in the phase comparator 26.

On the other hand, the reference signal is applied from the terminal 27 to the base of the transistor Tr34 of the phase shifter 50. In the phase shifter 50, the transistors Tr34 and Tr35 constitute a monostable multi-vibrator and generate a pulse at a constant time interval, when a reference pulse is applied from the terminal 51. This output pulse is differentiated by the capacitor C21 and then applied to the base of the transistor Tr31 in the phase comparator 26. As the result, the trapezoidal wave applied to the collector of the transistor Tr31 is sampled responsive to the signal applied to the base thereof. This sampling output sampling is held in the capacitor C24 until a subsequent sampling time point is reached. Therefore, the signal detected through the field-effect transistor (FET) Tr32 becomes a DC signal, whereby the DC signal is led out from the terminal 52 and supplied to the adding amplifier 20.

Normally, in the constant phase controlling system, the pulling-in range for synchronizing is smaller than the holding range. As a principle, this pulling-in range for synchronizing is determined by the cut-off frequency $\omega c$ of the frequency characteristics in the linear range of the controlling system, i.e., in the rising portion of the trapezoidal wave as above described. Practically, however, the cut-off frequency $\omega c$ of the controlling system is mostly determined by the DC motor 10 and characteristics of its mechanical load. Ordinarily it is very low. As a result, when the pulling-in range is small and the reference signal and the center frequency $\omega o$ are deviated greatly from each other, the constant phase controlling system produces a hunting phenomenon and the synchronization is not achieved.

To solve this problem, the apparatus of this embodiment provides for a feedback from the output of the transistor Tr32 in the phase comparator 26 through the capacitor C22 to the base of the transistor Tr34 of the phase shifter 50.

Figure 9:
FIG. 9 is a signal waveform chart of a trapezoidal wave.

Now, it will be assumed that the deviation of the reference signal from the center frequency of the controlling system is larger than the cut-off frequency of the constant phase controlling system. The controlling system is in a non-synchronized condition which causes a hunting phenomenon. At this time, the trapezoidal wave signal generated by the trapezoidal wave generator 25 is as shown in FIG. 9. The phase comparator 26, applies this signal to a random sampling in the parts $\theta b1$ and $\theta b2$ except in its rising part $\theta a$. Since the waveform parts $\theta b1$ and $\theta b2$ have no phase comparison functions, the phase controlling operation is not carried out. Then, the adding amplifier 20 adds the rectangular wave similar to the trapezoidal wave and varies in response thereto the rotation of the DC motor 10 is varied.

In the apparatus of the invention, the phase comparator 26 feeds back a signal to the phase shifter 50, whereby the apparatus operates as follows.

If the output of the phase comparator 26 varies stepwise in the positive (or negative) direction, the variation of the output is fed back through the capacitor C22 to the phase shifter 50. Thus, the amount of phase shift T2 of the phase shifter 50 becomes small (or large), as shown by T'2 (T''2) in FIG. 10 (B). If the rotational speed of the rotary head 15 is slow (in comparison with the frequency of the reference signal shown in the FIG. 10 (A)), there is a long time of sampling at the full part of the output pulse of the phase shifting amplitude T''2. That is, the time period of sampling in the flat portion $\theta b1$ of the trapezoidal wave shown in the FIG. 10 (C) becomes long.

Therefore, the signal of the rectangular waveform of the output of the phase comparator 26 becomes large in the part of the sampling level in the flat portion $\theta b1$ of the trapezoidal wave. The electrical potential of the capacitor C23 in the phase compensating circuit 28 is accordingly diminished so that the rotation of the DC motor 10 is accelerated, as shown by the length of the arrow line in FIG. 10 (D). Thus, the rotational speed of motor 10 gradually increases. As the frequency difference between the reference signal and the rotation approximates the cut-off frequency $\omega c$ in the linear area of the controlling system, the phase control is started again, and the synchronization is carried out.

Figure 10:
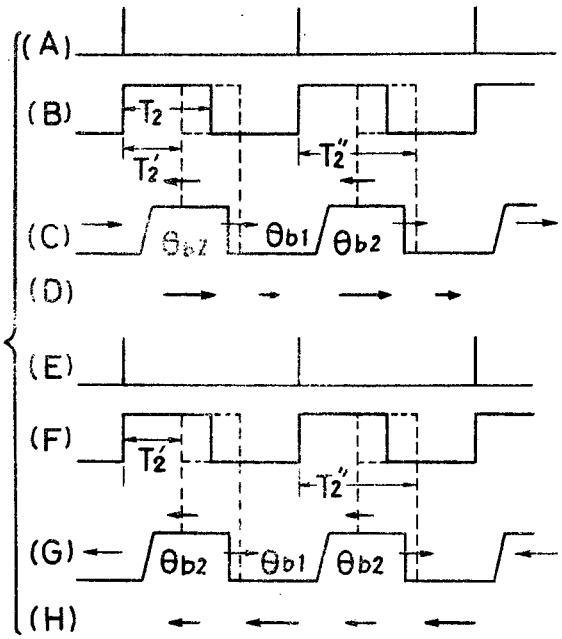
FIGS. 10 (A) through 10 (H) are signal waveform charts for the illustration of the operation of the phase shifter shown in FIGS. 7 and 8.

In a similar manner, when the rotational speed of the rotary head 15 is higher with respect to the reference signal shown in FIG. 10 (E), the time period of sampling becomes longer, as shown by the width T'2 in the FIG. 10 (F). That is, the time period of sampling part $\theta b2$, FIG. 10 (G), becomes longer. Therefore, the mean voltage of the capacitor C23 in the compensating circuit 28 becomes high and the rotational speed of the rotary head 15 becomes low. That is to say, the sampling level in the part $\theta b1$ will act to accelerate the rotation of the rotary head 15 as shown by the arrow (pointing rightward) in FIG. 10 (G). The sampling level in the part $\theta b2$ will act so that it may decelerate the rotation of the rotary head 15 as shown by by the arrow (pointing leftward) in the FIG. 10 (G). As described above, however, since the time of sampling in the part $\theta$ b2 becomes longer, the sampling level will act to decelerate the rotation of the rotary head 15, as shown totally in the FIG. 10 (H). The rotational speed of the rotary head 15 becomes gradually lower and the frequency difference of the rotation of the rotary head and the reference signal approximates the cut-off frequency, whereby the phase control action starts and the synchronization is carried out.

Thus, by adding the reference signal in the phase comparator 26 through capacitor C22 to the phase shifter 50 in an AC manner, a rapid synchronization is enabled even when there is a great deviation between the frequency of the reference signal and the rotational speed of the rotary head 15. Since the phase shifter 50 and the phase comparator 26 are connected through the capacitor C22, the DC gain of the constant phase controlling system is determined by the inclination of the trapezoidal wave.

Next, a third embodiment of the apparatus (FIGS. 11–13) of the invention will be described. FIG. 11 shows a block diagram partly incorporating the circuits of the third embodiment of the apparatus according to the invention. In the drawings, identical numerals are used to identify identical parts, as shown in the block diagrams of FIGS. 1 and 7, and the detailed description thereof is therefore omitted.

In the present embodiment, the output signal of the phase compensating circuit 28 is supplied to the phase shifter 61 of the frequency discriminator 19.

Now, it will be assumed that the rotational phase of the rotary head 15 is slowed by a disturbance in the synchronization of the rotational phase of the rotary head 15, with respect to the reference signal. Then, the phase compared error signal of the phase comparator 26 becomes smaller and the voltage applied in the emitter of a transistor Tr41 of a phase shifter 61 also becomes smaller. Accordingly, the collector current of the transistor Tr41, (i.e., the current flowing to a coil L11) becomes larger. As the current becomes larger at this time, the inductance of the coil L11 becomes smaller as will be apparent from the indication of FIG. 13.

Figure 12:
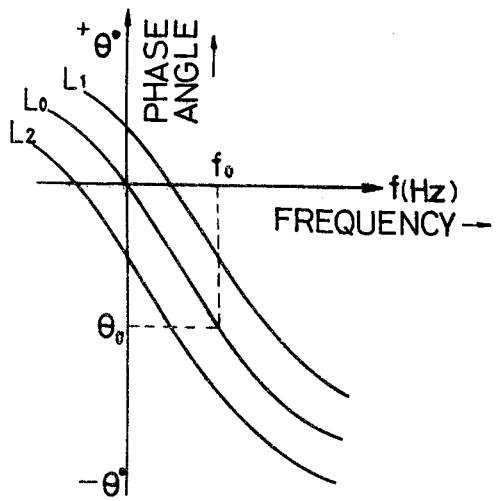
FIG. 12 is a graph indicating phase characteristics of the phase shifter in the frequency discriminator shown in FIG. 11.
Figure 13:
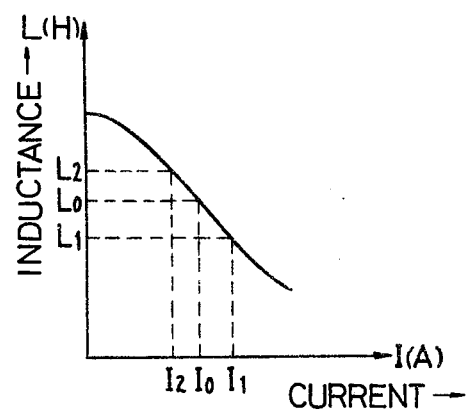
FIG. 13 is a graph indicating inductance-versus-current characteristics of a coil of a phase shifter.

As a result, the phase characteristics of the phase shifter 61 varies and the amount of the phase-shift becomes smaller as may be apparent from the indication of FIG. 12. The output of the frequency discriminator 19, (i.e., the DC error signal) becomes larger. Therefore, the DC motor 10 is accelerated and the rotational speed of the rotary head 15 becomes faster, whereby the rotary head 15 again returns to the synchronized condition.

The above description refers particularly to the case in which the phase of the rotary head 15 lags with respect to the phase of the reference signal. It will be readily understood that, in a more advance state of phase, the rotary head can easily move back into synchronization, as described above.

According to the apparatus of this embodiment, the adding amplifier in the apparatus of the above-mentioned embodiments may not be necessary.

Figure 14:
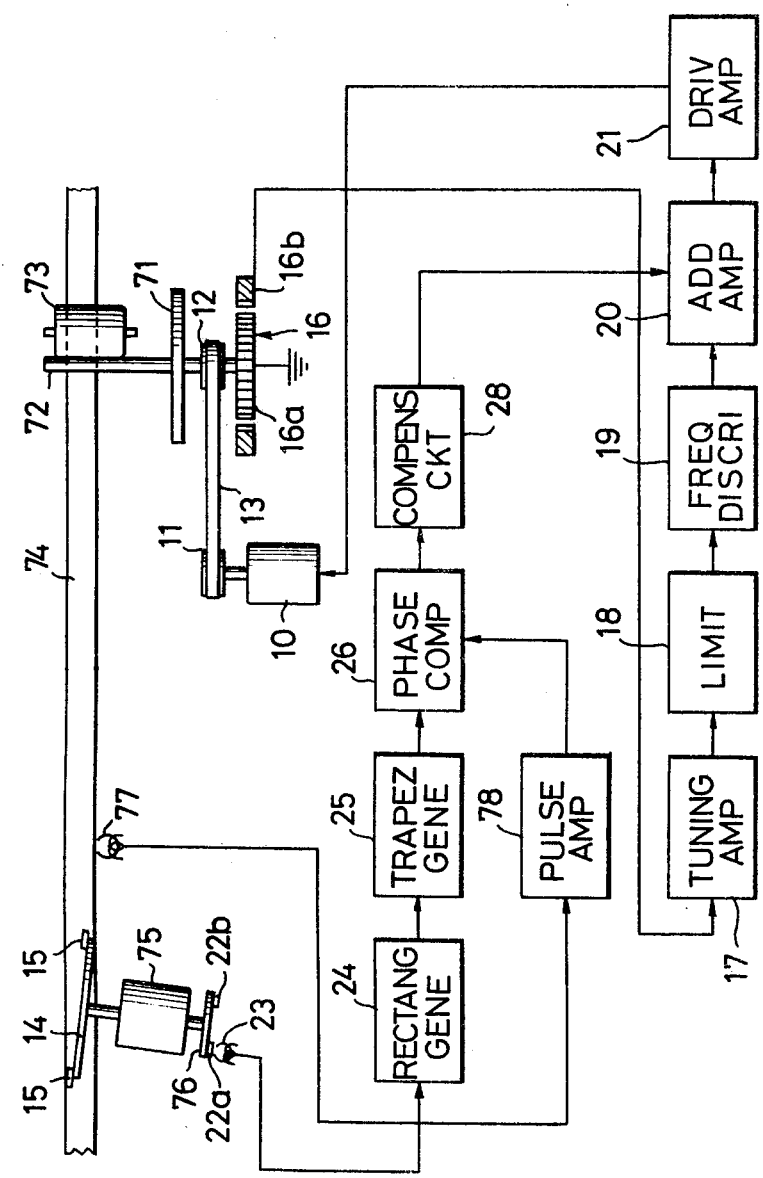
FIG. 14 is a schematic diagram of a capstan servo system as a fourth embodiment of the rotation controlling apparatus according to the invention.

FIG. 14 shows a schematic block diagram of a capstan servo system, as a fourth embodiment of the apparatus of this invention. In the same figure, identical numerals are used for the identical parts or for the parts having an identical function, and therefore the detailed description thereof is omitted.

In this embodiment, the DC motor 10 is used for driving the capstan. The rotation of the DC motor 10 is transmitted through the pulley 11, the belt 13, and the pulley 12 to a capstan 72, which integrally rotates with the pulley 12 and a flywheel. The capstan 72 cooperates with a pinch roller 73 and causes the transportation of a magnetic tape 74. The head plate 14 with the rotary head 15 is rotated by the DC motor, having a constant speed rotation control device. The permanent magnets 22a and 22b are fixed to a rotating disc 76 rotated by a motor 75.

In the control track of the magnetic tape 74 is recorded a vertical synchronizing signal, separated from a video signal during the recording time. This control signal is reproduced by a control head 77, during the reproducing time. A control pulse reproduced from the head 77 is amplified by a pulse amplifier 78, rectified in the waveform, and supplied to the phase comparator 26. A signal from the detecting head 23, indicates the rotation of the DC motor 75. This signal is applied to the rectangular wave generator 24. Also, a signal associated with the rotation of the capstan 72 is led out from the rotation detecting device 16. This signal is supplied to the tuning type amplifier 17. Output of the motor driving amplifier 21 is applied to the DC motor 10 so that the rotational speed and the rotational phase of the capstan 72 are controlled.

Figure 15:
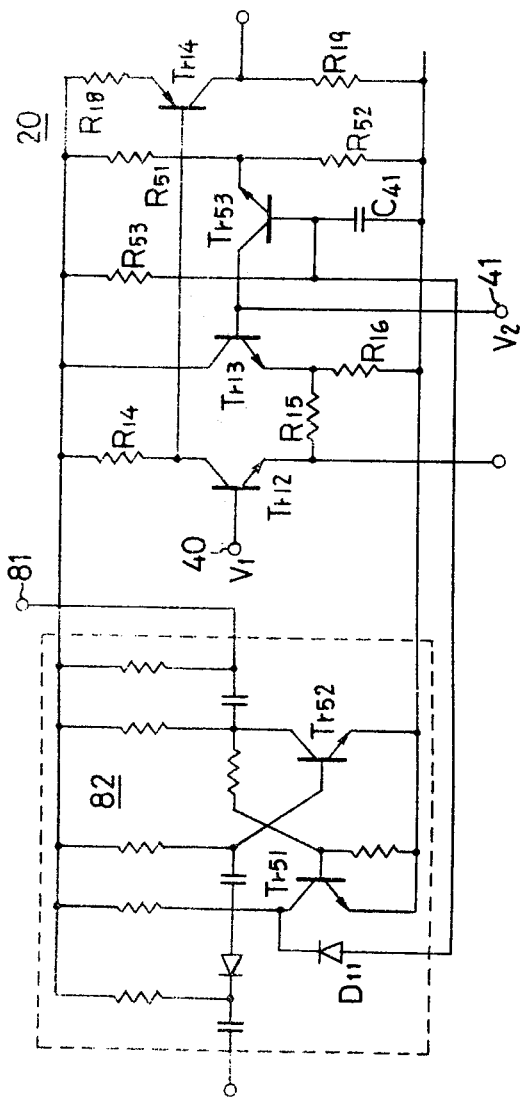
FIG. 15 is a circuit diagram of one embodiment of a circuit incorporating a portion of the capstan servo system.

If a control signal does not exist in the control track of the magnetic tape, because it has already been erased, the rotation of the capstan is totally disturbed. One embodiment of the circuit for solving this problem is shown in FIG. 15. According to the circuit of this embodiment, as the control signal is not reproduced from the magnetic head 77, a constant voltage is applied on an input terminal of the phase comparison error signal of the adding amplifier 20 to maintain a constant rotational speed of the capstan.

Where the reproducing control signal does not exist, there is no output in the phase comparator 26 and accordingly no input in a terminal 81. Oscillation of a monostable multi-vibrator 82 (which consists of transistors Tr51 and Tr52) should stop. The transistor Tr51 is in the "OFF" state, and its collector voltage becomes one equal to a power source voltage. On the other hand, the input side of the adding amplifier 20 of the phase comparison error signal is connected to a transistor Tr53. The emitter of the transistor Tr53 has a constant voltage, applied by way of resistors R51 and R52. The base of the transistor Tr53 is connected through the diode D11 to the collector of the transistor Tr51.

Here, the collector voltage of the transistor Tr51 becomes a power source voltage, and then the diode D11 is inversely biased. The transistor Tr53 is based-biased through a resistor R53 and switches "ON". When the transistor Tr53 switches "ON", the base of the transistor Tr13 is fixed at a constant emitter voltage, obtained by dividing the electrical potential across the resistors R51 and R52. The adding amplifier 20 receives a signal only from the constant speed rotation control system. As a result, the capstan 72 is rotated at a constant speed of rotation.

When a control signal is reproduced from the head 77, the collector of the transistor Tr51 switches ON and OFF alternately, so that the electric charge or discharge of the capacitor C41 is repeated with a time constant determined by the constants of the resistor R53, the capacitor C41, and the diode D11. The base voltage of the transistor Tr53 switches low and the transistor Tr53 becomes OFF. Since the transistor Tr53 is OFF, the input terminal voltage of the adding amplifier 20 is determined only by the phase comparison error signal voltage V2 issuing from the terminal 41, whereby the capstan 72 is controlled to be rotated, at a constant phase.

Further, this invention is not limited to these embodiments but variations and modifications may be made without departing from the scope and spirit of the invention.

What we claim is:

1. An apparatus for controlling the rotation of a rotating body in a recording and/or reproducing apparatus comprising:

a DC motor for driving said rotating body;

a first detecting means for detecting the rotational speed of said body as it is rotated by said DC motor, and for producing interrelatedly with the rotation of the body, an electrical signal of a frequency $n_1$ times (wherein $n_1 \gg 1$) said rotational speed;

first error signal forming means for producing a first error signal having a magnitude which corresponds to the advance or lag in the phase of the output of said first detecting device as compared to the phase of a standard reference signal;

second detecting means for detecting a signal associated with the rotational phase of said rotating body;

second error signal forming means for producing a second error signal by comparing the phase of the output signal of said second detecting means with the phase of a reference signal;

control signal forming means for producing a control signal by combining said first and second error signals;

means for controlling the rotation of said DC motor responsive to the control signal from said control signal forming means;

said rotation controlling means for the DC motor comprising:

a circuit means for generating an AC signal having a constant period and a constant amplitude, a circuit means for superposing said AC signal from said AC signal generating circuit and a control signal from said control signal forming means for slicing said superposed signal at a specific level, a driving amplification circuit means for carrying out an on-off switching operation in response to the signal thus sliced and for producing an output rectangular wave, and a circuit means for smoothing the output of said driving amplification circuit to produce a smoothed DC voltage and for applying said voltage to the DC motor.

2. The apparatus according to claim 1, in which said control signal forming means comprises an adding amplifier having a first transistor which is responsive to said first error signal applied to the base thereof, a second transistor having the emitter connected to the emitter of said first transistor via a resistor, said second transistor having said second error signal applied to the base thereof, and means for leading out an output from the collector of either one of said first and second transistors.

3. The apparatus according to claim 1, in which said second error signal forming means comprises a phase shifter for shifting a phase of said reference signal, a phase comparator for comparing the phase of the output signal of said second detecting means and the phase of an output reference signal of said phase shifter and for producing a phase comparison error output signal, and means for feeding back a part of the output of said phase comparator to said phase shifter to control the phase shifting amount thereof.

4. The apparatus according to claim 1, in which said first detecting means comprises a rotating gear having $n_1$ teeth, means for rotating said gear together with the rotation of said body, a stationary ring gear concentrically surrounding said rotating gear and having $n_1$ teeth confronting the surface of the teeth of said rotating gear, and circuit means for detecting an electrical signal which changes as a function of the changes in the rotation of said rotating gear responsive to the electrostatic capacitance between the rotating gear and the stationary gear, and said second detecting means comprises a permanent magnet rotating with said rotating body and a detecting magnetic head for detecting passage of said permanent magnet.

5. The apparatus according to claim 1, in which said first error signal forming means comprises: a phase shifter for causing the phase to lag with respect to an input signal of a frequency which is higher than a predetermined frequency and for advancing the phase with respect to an input signal of a frequency which is lower than said predetermined frequency; a first NAND circuit for obtaining a NAND gate output if an output signal from said first detecting means coincides with a signal obtained by applying said output signal to said phase shifter; a second NAND circuit for obtaining a NAND product of said two signals after polarity inversion thereof; and a circuit for smoothing the combined outputs of said first and second NAND circuits, and said control signal forming means comprises means supplying said second error signal to said phase shifter.

6. The apparatus according to claim 1, in which said rotating body includes a rotating magnetic head for recording and/or reproducing a video signal on/from a magnetic tape, and said first and second detecting means operate responsive to rotational detection respectively cooperating with a part which rotates integrally with said rotating magnetic head.

7. An apparatus for controlling the rotation of a rotating body in a recording and/or reproducing apparatus comprising:

means including a first DC motor for rotating a capstan;

first detecting means for detecting the rotational speed of said capstan, interrelatedly with the rotation of said first DC motor, said first detecting means being responsive to an electrical signal of a frequency of $n_1$ times (where $n_1 \gg 1$) said rotational speed;

first error signal forming means for producing a first error signal having a magnitude which varies in accordance with the advance or the lag of the phase of the output of said first detecting means;

means including a second motor for rotating a rotary head;

second detecting means for detecting a signal which varies responsive to the rotational phase of the rotary head which is rotated by said second motor;

second error signal forming means for producing a second error signal by comparing the output signal of said second detecting means with a reference signal;

control signal forming means for producing a control signal by combining said first and second error signals; and means for controlling the rotation of said first DC motor in response to the control signal from said control signal forming means, said driving rotation controlling means of the DC motor comprising:

a circuit for generating an AC signal having a constant period and constant amplitude, a circuit for superposing said AC signal from said AC signal generating circuit and a control signal from said control signal forming means and for slicing said superposed signal at a specific level, a driving amplification circuit means for switching on or off in response to the signal thus sliced and for producing a rectangular wave output, and a circuit means for smoothing the output of said driving amplification circuit to produce a smoothed DC voltage and applying said voltage to the first DC motor.

8. An apparatus for controlling the rotation of a rotating body in a recording and/or reproducing apparatus comprising:

means including a DC motor for rotating a body;

rotational phase detection means for detecting a first electrical signal having a phase which corresponds to the rotational phase of the rotating body;

a source of a reference pulse signal;

phase discriminating means comprising trapezoidal wave generator means responsive to the first electrical signal for generating a trapezoidal signal in synchronism with the first electrical signal, phase comparator means for comparing the phase of the trapezoidal wave signal with the phase of the reference pulse signal to produce an output signal in accordance with the phase difference between the trapezoidal wave signal and the reference pulse signal, and holding means for holding the output signal of said phase comparator means to produce a first error signal;

rotational speed detection means for detecting a second electrical signal having a frequency which varies as a function of the rotational speed of the rotating body, said second electrical signal having a frequency which is $n_1$ times the rotational speed;

frequency discriminating means comprising phase shifting means responsive to the second electrical signal for causing a lag in the phase of the second electrical signal, said lag varying in accordance with the difference between the frequency of the second electrical signal and a predetermined frequency when the frequency of the second electrical signal is higher than the predetermined frequency and for advancing the phase of the second electrical signal in accordance with the difference between the predetermined frequency and the frequency of the second electrical signal when the frequency of the second electrical signal is lower than the predetermined frequency, first NAND circuit means for providing an output signal responsive to a coincidence between the output of said phase shifting means and the second electrical signal, first phase inverting means for inverting the phase of the second electrical signal, second phase inverting means for inverting the phase of the output signal of said phase shifting means, second NAND circuit means for providing an output signal responsive to a coincidence between the output of the first and second phase inverting means, and smoothing means for smoothing the combined outputs of the first and second NAND circuit means to produce a second error signal;

control signal forming means for producing a control signal by combining the first and second error signals;

oscillator means for generating an AC signal having a periodically varying amplitude and having the predetermined frequency;

slicing circuit means responsive to the control signal and to the AC signal for slicing a superimposition signal of the control signal and the AC signal at a specific level;

switching amplifier means having an output current responsive to the output signal of said slicing circuit means; and filter means for smoothing the output of said switching amplifier means to produce a smooth DC voltage and for applying the DC voltage to said DC motor.

9. An apparatus according to claim 8 further comprising switching circuit means connected in series with said switching amplifier means, said switching circuit means being switched off responsive to the output signal of said slicing circuit means when there is a current from said switching amplifier means and for becoming conductive to bypass said filter means to damp the rotation of said DC motor when there is no current from said switching amplifier means.

10. An apparatus according to claim 8 wherein said phase discriminating means further comprises multivibrator circuit means responsive to the reference pulse signal for shifting the phase of the reference pulse signal, said phase comparator means comparing the phase of the trapezoidal wave signal with the phase of the output signal of said multivibrator circuit means, and means for feeding back the output signal of said holding means to said multivibrator circuit means to control the phase shifting of the reference pulse signal.

11. An apparatus for controlling the rotation of a rotating body in a recording and/or reproducing apparatus comprising:

means including a DC motor for rotating a body;

rotational phase detection means for detecting a first electrical signal having a phase which corresponds to the rotational phase of the rotating body;

a source of a reference pulse signal;

phase discriminating means comprising trapezoidal wave generator means responsive to the first electrical signal for generating a trapezoidal wave signal in synchronism with the first electrical signal, phase comparator means for comparing the phase of the trapezoidal wave signal with the phase of the reference pulse signal to produce an output signal in accordance with the phase difference between the trapezoidal wave signal and the reference pulse signal, and holding means for holding the output signal of said phase comparator means to produce an error signal;

rotational speed detection means for detecting a second electrical signal having a frequency which varies as a function of the rotational speed of the rotating body, said second electrical signal having a frequency which is $n_1$ times the rotational speed;

frequency discriminating means comprising phase shifting means including a transistor having a collector electrode connected to a power source through a parallel combination of a coil and a capacitor, an emitter electrode connected to ground through a resistor and a base electrode having a second electrical signal supplied thereto, and means for applying the error signal to the emitter electrode to change the inductance of the coil whereby an output signal appears at the collector electrode with a phase which is shifted corresponding to the level of the error signal in reference to the second electrical signal, first NAND circuit means having an output signal responsive to a coincidence of an output from said phase shifting means and the second electrical signal, first phase inverting means for inverting the phase of the second electrical signal, second phase inverting means for inverting the phase of the output signal of said phase shifting means, second NAND circuit means having an output signal responsive to a coincidence of the first and second phase inverting means, and smoothing means for smoothing the combined outputs of the first and second NAND circuit means to produce a control signal;

oscillator means for generating an AC signal having a periodically varying amplitude and having the predetermined frequency;

slicing circuit means responsive to the control signal and to the AC signal for slicing a superimposition signal of the control signal and the AC signal at a specific level;

switching amplifier means having an output current in accordance with the output signal of said slicing circuit means; and filter means for smoothing the output of said switching amplifier means to produce a smooth DC voltage and for applying the DC voltage to said DC motor.

* * * * *